Aug. 9, 1949.  J. R. HOPKINS  2,473,398
METHOD OF MAKING METALLIC BELLOWS
Filed Dec. 23, 1944  2 Sheets-Sheet 1

Inventor
John R. Hopkins
by Roberts Cushman Crow
att'ys.

Aug. 9, 1949.  J. R. HOPKINS  2,478,398
METHOD OF MAKING METALLIC BELLOWS
Filed Dec. 23, 1944  2 Sheets-Sheet 2
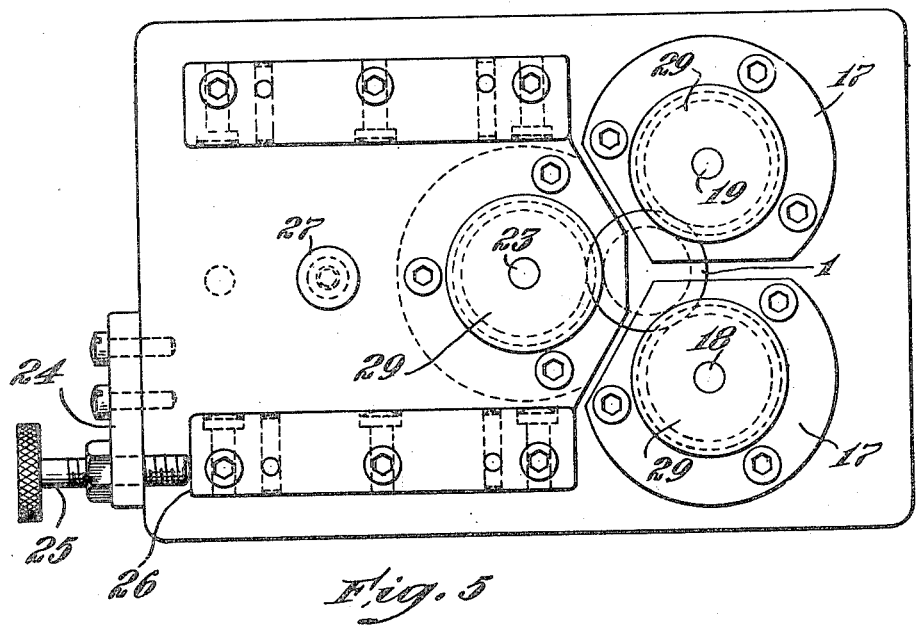
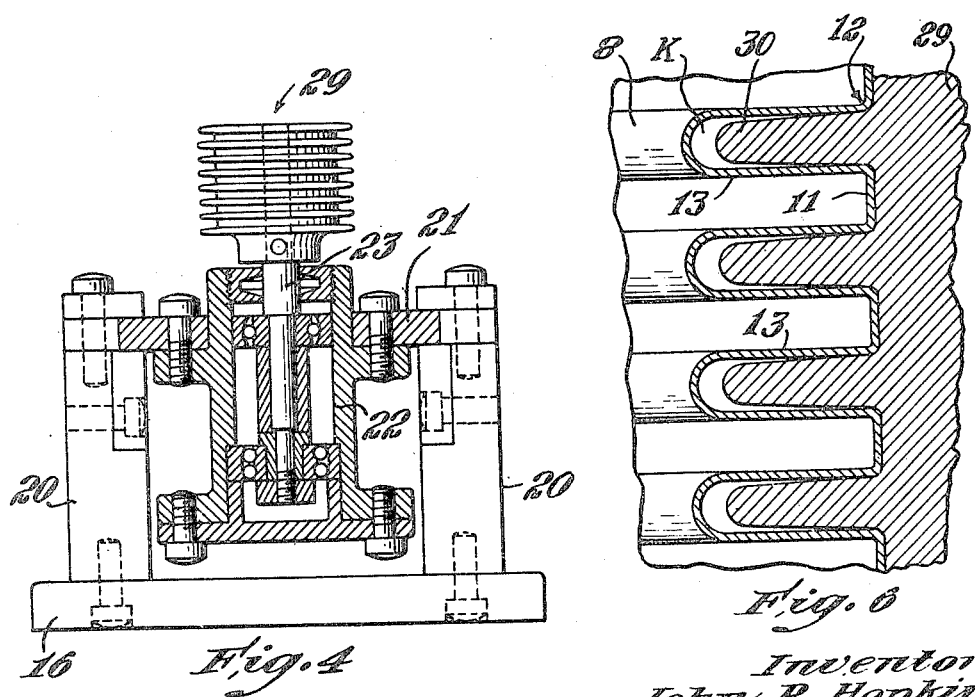
Inventor
John R. Hopkins
by Roberts Cushman Groves
Att'ys Patented Aug. 9, 1949

2,478,398

UNITED STATES PATENT OFFICE 2,478,398

METHOD OF MAKING METALLIC BELLOWS

John R. Hopkins, Bridgeport, Conn., assignor to Manning, Maxwell & Moore, Incorporated, New York, N. Y., a corporation of New Jersey Application December 23, 1944, Serial No. 569,507

6 Claims. (Cl. 153—73)

This invention pertains to a novel method of making metallic bellows.

Metallic bellows are now employed for a wide variety of purposes, in particular as pressure motors in instruments or apparatus having parts which move in response to fluctuations in the pressure of a fluid medium. Heretofore bellows of this type have been made, for example by building up a bellows from a series of cupped plates or diaphragms, by rolling or spinning a length of seamed or seamless tubing; and by the so-called "hydro" method in which hydraulic pressure is employed in combination with appropriate dies.

Bellows made in accordance with each of these several prior methods possess certain distinguishing characteristics—for instance, the built-up bellows may be made to fairly accurate dimensions both as to external diameter and effective area, but on the other hand, this type of bellows has the disadvantage that it is heavier and more bulky than other types as the result of the flanging and soldering or welding operations involved; the distribution of internal stresses in the metal is bad, and the operation of soldering or welding, so as to insure the many joints against leakage, makes the operation very expensive.

Bellows formed by rolling or spinning a length of tubing may be made quite accurately as respects external diameter and effective area. They are lighter in weight than the built-up bellows and cheaper to construct, but, on the other hand, the metal is subjected to work hardening during the rolling process and must be annealed, leaving a product which is unreliable as to wall thickness, not uniform as to internal stresses, and which is of comparatively short life in service. Bellows made by the so-called hydro method as described, for example, in the patent to Clifford 1,823,532, September 15, 1931, may be made of substantially uniform wall thickness and are quite free from internal stresses and tool marks so that they have a very long life in service. On the other hand, it is difficult to make bellows in accordance with this "hydro" method of accurate predetermined external diameter and effective area. However, the working life of this type of bellows is so much better than that of the spun or rolled type that the hydro-formed bellows have substantially superceded the spun type.

In certain types of instrument, two bellows are arranged in opposition. As illustrative of this arrangement, reference may be had to the patent to Robbins No. 2,300,810, November 3, 1942, which discloses a pressure gauge, particularly designed for use with airplane engine manifolds, so constructed as to be substantially independent of barometric changes. Assuming that the two bellows employed in an instrument such as that shown in the Robbins patent have substantially like characteristics in respect to response to variations in external pressure, then the instrument is highly satsifactory for the intended purpose. On the other hand, if the bellows devices are different in characteristics, inaccuracies are introduced so that the instrument does not function as perfectly as desired. In order to insure optimum operation of such an instrument as that of the Robbins patent, it is necessary to be able to make the constituent bellows of any given unit so that their outside diameters and effective areas will have a definite relationship when in free or normal position; this relationship must not alter substantially during the range of movement of the bellows; it must not substantially change when the bellows unit is subjected to variations in external pressure such as those to which the instrument is exposed during use; and for any pressure differential between the two bellows of a unit, the same value of differential must produce to an exact degree the same travel or change in linear dimensions regardless of changes of differential in pressure between the inside and the outside of the bellows of the unit.

In a metallic bellows made by the hydraulic pressure method the several inwardly directed ribs are of substantially like diameter, since these inwardly directed ribs are formed about the edges of rigid annular former plates whose internal diameters are exactly alike. On the other hand, the limitations of this method make it substantially impossible exactly to fix the external diameters of the outwardly directed ribs, so that in the completed bellows the outwardly directed ribs may be of substantially different diameters in any given bellows, or even if in a given bellows they are of substantially the same diameters, they may be of a different diameter in another bellows made by the same method and intended to be of the same dimensions.

Bellows of this kind vary in length in response to fluid pressure acting upon the exposed surfaces of the ribs, and thus the axial expansion or contraction of the bellows in response to a given pressure depends to a major degree upon the effective area of the exposed surface of the bellows. Manifestly a variation in the external diameter of the outwardly directed ribs has a greater effect upon the area of the bellows than does a corresponding variation in the diameter of the inwardly directed ribs, and thus it is far more important to insure uniformity in diameter of the outwardly directed ribs than of the inwardly directed ribs. However, as just pointed out, the hydraulic method of producing bellows, while very desirable for many reasons, is not adapted to produce bellows whose outwardly directed ribs are of identically the same external diameter and thus bellows made by this method, in accordance with prior practice, are not suitable for use in matched pairs or when it is desired to insure interchangeability of one bellows for another without affecting the operation of the apparatus in which such a bellows is employed.

The present invention has for its principal object the provision of a method of making bellows which have the characteristics just above pointed out so that bellows, made in accordance therewith, may be used in instruments in which opposed bellows are employed, with the certainty of obtaining optimum results in respect to accuracy and sensitivity. A further object is to provide a novel method of making a bellows such that the completed bellows will have a service life substantially as great as that of an ordinary bellows made by the hydro method.

A further object of the present invention is to provide a method of making bellows which have a larger effective area for a given external diameter than bellows of conventional type; also bellows which may be handled with less danger of injury from denting or the like, than usual prior bellows; and also bellows which are substantially less subject to hysteresis than bellows such as customarily made by the hydraulic method.

Other and further objects and advantages of the invention will be pointed out in the following more detailed description and by reference to the accompanying drawings wherein:

Fig. 4 is a vertical section on the line 4—4 of Fig. 3.

Fig. 5 is a plan view of the apparatus shown in Fig. 3.

Fig. 6 is a diagrammatic, fragmentary elevation to large scale, illustrating one of the forming dies or rolls of the apparatus shown in Fig. 3 and illustrating its action upon the bellows device.

Figure 2:
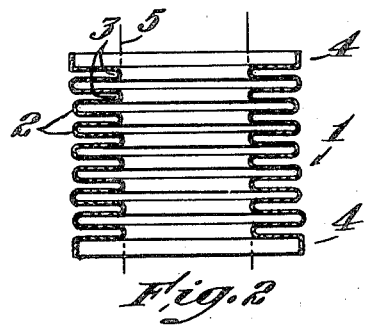
Fig. 2 is a similar view illustrating a bellows made by prior methods and which may effectively be used as a blank or embryo to which the method of the present invention is applied in the production of the article shown in Fig. 1.
Figure 3:
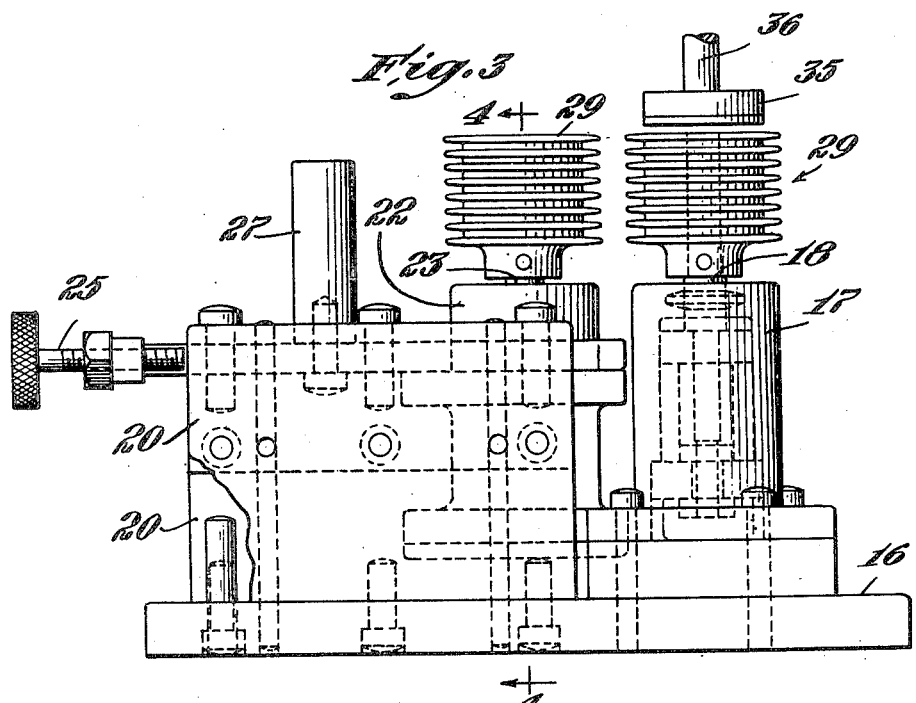
Fig. 3 is a side elevation of apparatus useful, for example, in the practice of the method of the present invention.

Referring to the drawings and particularly to Fig. 2, the numeral 1 designates a metallic bellows of a type such as results from the practice of the method disclosed, for example, in the patent to Clifford No. 1,823,532, dated September 15, 1931. Such a bellows is made from a length of thin seamless tubing, and in its completed form comprises outwardly directed, axially spaced circumferential ribs 2 and corresponding inwardly directed ribs 3, and usually comprises so-called "lips" 4, designed for attachment to rigid head members constituting closures for the opposite ends of the bellows, thereby to form the complete pressure motor. When made in accordance with the method of the Clifford patent above referred to, the formation of the ribbed structure from the initially cylindrical tubing is accomplished by the combined action of internal hydraulic pressure and externally arranged rigid annular former plates. As a result of this procedure, the inner edges of the inwardly directed ribs 3 lie in a geometrical cylindrical surface indicated in broken lines at 5, these inwardly directed ribs thus being of substantially exactly the same inner diameter. On the other hand, by reason of limitations in this method of procedure, the outwardly directed ribs 2 may not always be of the same diameter, and thus the effective areas of the several ribs are not always the same. Thus, two bellows devices made in accordance with the prior method may not have identically equal effective areas, and thus when subjected to the same pressure may not contract or expand to exactly the same amounts. It will be noted that in this bellows of the prior art, the outer edges of the ribs 2 are rounded to arcuate curvatures, and that these outwardly directed ribs are of approximately the same external diameter as the lips 4. In such a bellows there is a pronounced hysteresis or lag in operation, apparently resultant from the localization of bending stress at the arcuately curved outer edges of the ribs 2. Moreover, when such a bellows is accidentally dropped or subjected to rough usage, the outer edges of the ribs 2 are very easily deformed or dented, since there is nothing to protect them from injury.

Figure 1:
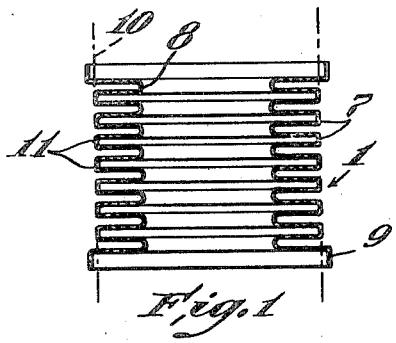
Fig. 1 is a diametrical, vertical section illustrating a bellows made in accordance with the present invention.
Figure 8:
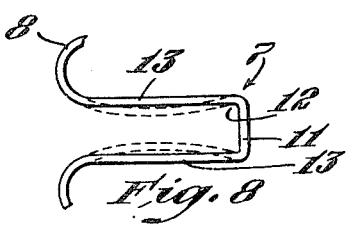
Fig. 8 is a fragmentary section, to large scale through one of the outwardly directed ribs of the bellows of Fig. 1 showing details of construction.

The novel bellows of the present invention, as illustrated in Figs. 1 and 8, like the bellows shown in Fig. 2 consists of a length of thin walled metal tubing, preferably seamless, so shaped as to provide the outwardly directed axially spaced ribs 7, the inwardly directed ribs 8 and the attaching lips 9. In this construction, as shown more particularly in Fig. 8, the outer edge of each of the outwardly directed ribs 7 is formed to a right cylindrical curvature as shown at 11, and this cylindrical surface merges, at substantially right angular bends 12, with the spaced opposed radial walls 13 of the rib. These walls 13 lie in substantially parallel planes perpendicular to the axes of the bellows and perpendicular to the cylindrical edge surfaces 11 except where they merge at their inner portions with the curved edges of the inwardly directed ribs 8. In this bellows, as illustrated in Fig. 1, the cylindrical edge surfaces 11 of the several ribs 7 are all of the same external diameter so that these surfaces 11 would all contact a geometrical cylindrical surface such as indicated in broken lines at 10. Since each of these outwardly directed ribs is thus of the same effective diameter, and since the walls of each rib are substantially parallel and perpendicular to this outer cylindrical surface 11, the effective area of the bellows is readily calculated, and if two bellows are made with their outwardly directed ribs 7 of the same outside diameter (it being assumed that the material is the same) the resultant bellows will respond in substantially the same way to applied pressure. As indicated by the dotted lines in Fig. 8, the effect of applied, external pressure apparently results in bending the walls 13 inwardly about the points 12, the cylindrical edge portion 11 apparently acting as a rigid strut. Whether or not the parts act exactly in this way, it is found that such a bellows is subject to far less hysteresis than bellows such as shown in Fig. 2. In fact, the hysteresis may not exceed one-third of that inherent in the type of bellows shown in Fig. 2.

As illustrated in Fig. 1, the diameters of the outwardly directed ribs are less than the diameters of the lips 9, and thus if the bellows be laid upon a supporting surface, the lips 9 support the surfaces 11 of the ribs away from the support so that the edges or ribs are to some extent protected from injury. It is further to be noted that the radial walls of the ribs of a bellows such as that of Fig. 1 have a greater effective area for the action of the pressure fluid than in a bellows such as shown in Fig. 2, due to the fact that the cylindrical surface 11 has been substituted for the curved edge of the rib of Fig. 2.

While it is within the scope of the invention to form the bellows of Fig. 1 in other ways, it has been found that very desirable results may be obtained by employing a bellows such as that shown in Fig. 2 (formed by the hydraulic method) as a blank or embryo for use in producing the bellows of Fig. 1. While a bellows such as shown in Fig. 2 and above disclosed does have certain undesirable characteristics, in particular as respects uniformity in operation, it does, nevertheless, possess very great advantages over bellows made in accordance with certain other prior methods; in particular its wall thickness is substantially uniform and the metal which forms its walls is substantially free from severe internal strains and from tool marks such as would shorten its life in use. An embryo such as the hydraulically formed bellows 1 of Fig. 2 is thus very desirable as a starting point in the method of the present invention but it is contemplated that an embryo bellows, made in some other manner but having the characteristics particularly as respects uniform wall thickness and freedom from internal strains of a bellows made by the hydraulic method, might be employed as the blank in the present method.

Assuming that an embryo bellows of the proper type has been provided, the present method contemplates subjecting this bellows to external pressure while leaving its interior surface, or at least the inner edges or bends 8 of the inwardly directed ribs 3, wholly free and unconstrained. This external pressure is so applied as to reshape the outwardly directed ribs and convert them from the shape shown in Fig. 2 to that shown in Figs. 1 and 8. Preferably, this reshaping is carried out by the application of rolling pressure, thus avoiding the establishment of severe internal strains in the metal during the reshaping process. Conveniently this reshaping operation is carried out by the employment of a plurality of roller dies having accurately shaped grooves which receive the outwardly directed ribs 2 of the embryo bellows and by rolling pressure conform these ribs 2 to the contours of the grooves in the roller dies. These grooves are of approximately rectangular shape in any diametrical plane of the roller dies, although for best results they may have a sight taper inwardly, and when the embryo bellows of Fig. 2 is subjected to this rolling pressure, the metal of the ribs 2 flows and conforms itself to these walls of the grooves in the dies with the results that when removed from the dies, the bellows has the exact form shown in Fig. 1, the metal springing slightly after removal from the dies so that in the finished bellows the walls 13 of the ribs are substantially parallel.

Apparatus for use in performing this operation is illustrated in Figs. 3 to 7 inclusive merely by way of example of means convenient for performing the operation, but without intent to limit the method to the use of this particular apparatus.

The apparatus as illustrated, comprises a base member 16 upon which are mounted two bearing housings 17 within which are arranged bearings for a pair of spaced vertical shafts 18 and 19. The base also supports a pair of spaced uprights 20 which carry guideways for a carriage 21 which is movable back and forth in a path perpendicular to a line joining the axes of the shafts 18 and 19. This carriage 21 supports a bearing housing 22 in which are arranged bearings for a vertical shaft 23, whose axis is in a vertical plane bisecting the line joining the axes of the shafts 18 and 19.

The frame of the apparatus is provided with a member 24 which has an internally screw-threaded aperture for the reception of a thumb screw 25 designed to engage a fixed stop 26 thereby to limit movement of the carriage in the rearward direction. The carriage as shown is provided with a simple handle 27 by means of which it may be moved in and out, but if desired, a lever or other means may be employed to facilitate such movement of the carriage.

The shafts 18, 19, and 23 project upwardly above their bearings, and on the upper end of each shaft there is mounted a roller die 29.

Figure 7:
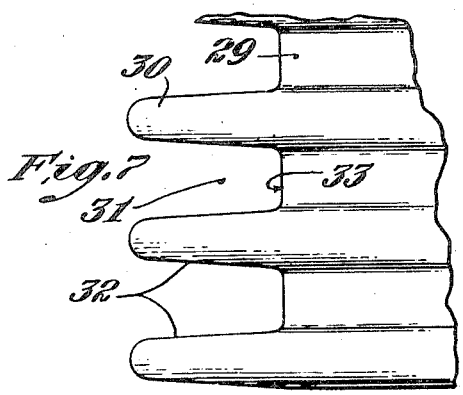
Fig. 7 is a view similar to Fig. 6 showing the forming roll or die but omitting the bellows.

The several roller dies 29 are alike in construction and dimensions. As illustrated in Fig. 7, for example the roller die 29 is provided with a plurality of outwardly directed, axially spaced, rigid circumferential ribs 30, separated by grooves 31. The walls 32 of each groove 31 are approximately parallel, although it is found that if they incline inwardly at an angle of approximately 6°, somewhat better results are attainable than though the walls are exactly parallel, since the metal of the bellows tends to spring slightly when removed from the die, and in thus springing, the walls 13 of the ribs assume the final parallel relation which is desired. The inner walls 33 of the grooves 31 are true right cylindrical surfaces. Preferably, these cylindrical surfaces 33 merge with the walls 32 in slight fillets for example of the order of 0.01" radius. The ribs 30 are of such external diameter that during the forming operation the outer edges of these ribs never contact the bellows, there being a clearance as shown at K (Fig. 6) between the outer edges of the ribs 30 and the bends 8 of the ribs 3 of the embryo bellows.

In the operation of the apparatus, the carriage 21 is pulled forwardly (to the left, Fig. 5) and an embryo bellows (such as that of Fig. 2) is arranged so that its ribs 2 enter into the grooves 31 of the two rear roller dies 29. The carriage 21 is then pushed rearwardly by means of the handle 27 or other means provided until the forward roller die also engages the embryo bellows. One at least of the dies 29 is rotated at high speed, for example, at a speed of the order of 2000

R. P. M. This may readily be accomplished by causing a friction clutch element indicated at 35, Fig. 3, and carried by a driven, rotating shaft 36, to bear against the upper surface of one of the dies 29.

However, other means for rotating the dies may be employed if desired.

Assuming that one of the dies are thus rotating at high speed and that the carriage is being pushed back so to force the embryo bellows against the dies 29, the results of the rapid rotation of the driven die is rapidly to turn the bellows and also the other dies in contact with, and in a very short space of time, for example, a matter of a few seconds, the embryo bellows is reshaped so that the outer portions at least of its outwardly directed ribs 7 conform substantially exactly to the shapes of the grooves 31 in the roller dies, all of its outwardly directed ribs being of substantial identical predetermined external shape and dimensions. The carriage is then retracted and the bellows removed, the walls of the several ribs immediately assuming the parallel relation shown in Fig. 1. The operation may be carried out at very high speed, the reshaping of the bellows being performed very easily and without resort to the employment of highly skilled operatives, and the finished bellows is substantially free from serious internal strains. On the other hand, it possesses the desired uniformity in dimensions and response to applied pressure which is requisite in bellows designed to be used in matched pairs or interchangeably.

While one desirable embodiment of the invention is herein disclosed by way of example, together with desirable means useful in performing the method, it is to be understood that the invention is broadly inclusive of any and all modifications, both as to order of steps and specific steps of the operation, and as to apparatus useful in performing the process, such as fall within the scope of the appended claims.

I claim:

1. That method of forming a metallic bellows which comprises as steps providing an embryo bellows consisting of a unitary piece of thin metal, tubular in form and having substantially uniformly spaced circumferentially extending outwardly directed ribs whose outer edges are rounded to arcuate curvature and in which the internal structure of the metal has substantially the same characteristics as those of the metal in a bellows formed hydraulically, and subjecting the embryo bellows to rolling pressure, applied externally only and in such a way as to cause the outer edge of each of the several ribs to assume a true right cylindrical shape with the cylindrical surfaces of the several ribs all of the same diameter.

2. That method of forming a metallic bellows which comprises as steps providing an embryo bellows consisting of a unitary piece of thin metal, tubular in form and having substantially uniformly spaced circumferentially extending outwardly directed ribs whose outer edges are arcuate, and in which the internal structure of the metal has substantially the same characteristics as those of the metal in a bellows formed hydraulically, and subjecting the embryo bellows to rolling pressure externally applied while leaving the interior of the bellows free from constraint, the pressure being so applied as to cause the opposite radial walls of each rib to become substantially parallel and to cause the outer edge of each rib to become a true right cylindrical surface, substantially perpendicular to the radial walls of the respective rib.

3. That method of forming a metallic bellows which comprises as steps providing an embryo bellows consisting of a unitary piece of thin metal, tubular in form and having substantially uniformly spaced, circumferentially extending outwardly directed ribs whose outer edges are curved, and in which the internal structure of the metal has substantially the same characteristics as those of the metal in a bellows formed hydraulically, and subjecting the embryo bellows to rolling pressure externally applied while leaving the interior of the bellows free from constraint, the pressure being so applied as to reduce the several ribs to substantially the same dimensions both in respect to diameter and to the distance between opposite walls of the respective rib while, at the same time, causing the outer edges of the several ribs to become true cylindrical surfaces all of the same diameter.

4. That method of making metallic bellows of substantially uniform predetermined external effective surface areas wherein there is first formed by the action of internal fluid pressure an embryo bellows of thin metal having axially spaced circumferential ribs which are not necessarily of exactly the same external diameters and which have curved outer edges, characterized in subjecting the embryo bellows to pressure while leaving at least the edges of its inwardly directed ribs unconstrained, the pressure being so applied as to reduce each of the several externally directed ribs to substantially the same external dimensions in all diametrical planes of the bellows.

5. That method of making metallic bellows of substantially uniform predetermined external effective surface areas, which includes the step of forming hydraulically an embryo bellows of thin metal having axially spaced circumferential ribs which are not necessarily of exactly the same external diameters and which have curved outer edges, characterized in subjecting the embryo bellows to external pressure between roller dies while leaving its interior surfaces unconstrained, the dies being so shaped and the pressure being so applied that each of the external ribs is reduced to the same external dimensions in all diametrical planes of the bellows while causing the outer edge of each rib to become a right cylindrical surface.

6. That method of forming a metallic bellows which includes the step of preparing by the use of hydraulic pressure an embryo bellows consisting of a unitary piece of thin metal and having outwardly directed axially spaced circumferential ribs whose outer edges are arcuate, and in which the metal is substantially free from internal stresses and tool marks, characterized in subjecting the embryo bellows to pressure between externally applied rolls while leaving the interior surfaces of the bellows unconstrained, the rolls having external ribs separated by intervening grooves which are of substantially rectangular radial section and all of the same dimensions, the pressure being so applied by the rolls as to cause the ribs of the embryo bellows to conform externally in shape substantially exactly to the shapes of the grooves in the rolls.

JOHN R. HOPKINS.

(References on following page)

REFERENCES CITED

The following references are of record in the file of this patent:

UNITED STATES PATENTS

| Number | Name | Date |
|---|---|---|
| 297,244 | Emery et al. | Apr. 22, 1884 |
| 783,545 | Rowland | Feb. 28, 1905 |
| 971,838 | Fulton | Oct. 4, 1910 |
| 1,198,390 | Brinkman | Sept. 12, 1916 |
| 1,271,455 | Fitts | July 2, 1918 |
| 1,506,966 | Bezzenberger | Sept. 2, 1924 |
| 1,823,532 | Clifford | Sept. 15, 1931 |
| 1,879,663 | Dreyer | Sept. 27, 1932 |
| 1,946,472 | Babcock | Feb. 13, 1934 |
| 2,050,228 | Mantle | Aug. 4, 1936 |

FOREIGN PATENTS

| Number | Country | Date |
|---|---|---|
| 825 | Great Britain | Apr. 5, 1856 |
| 22,570 | Australia | Dec. 27, 1905 |